United States Patent
Diamond et al.

(10) Patent No.: US 6,591,295 B1
(45) Date of Patent: Jul. 8, 2003

(54) METHODS AND APPARATUS FOR USING MULTIMEDIA DATA STORED IN A RELATIONAL DATABASE IN WEB APPLICATIONS

(75) Inventors: David Lane Diamond, Merrimack, NH (US); John Louis Janosik, Jr., Nashua, NH (US); Simon John Oxbury, Nashua, NH (US); Michael Rubino, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/434,243

(22) Filed: Nov. 5, 1999

(51) Int. Cl.[7] ............................................. G06F 15/16
(52) U.S. Cl. ...................... 709/217; 709/219; 709/203; 709/226; 707/3; 707/10; 707/102
(58) Field of Search ................................ 709/217, 218, 709/219, 226, 203; 707/102, 100, 3, 10, 10 G (56) References Cited

U.S. PATENT DOCUMENTS

| 5,924,099 | A | * | 7/1999 | Guzak et al. ................. 705/75 |
| 5,930,786 | A | * | 7/1999 | Carino et al. ................. 703/3 |
| 6,012,067 | A | * | 1/2000 | Sarkar ....................... 358/1.13 |
| 6,260,044 | B1 | * | 7/2001 | Nagral et al. ................. 707/10 |
| 6,397,219 | B2 | * | 5/2002 | Mills ........................... 707/10 |
| 6,400,378 | B1 | * | 6/2002 | Snook ......................... 345/716 |

* cited by examiner

*Primary Examiner*—Ario Etienne
*Assistant Examiner*—Abdullahi E. Salod
(74) *Attorney, Agent, or Firm*—Sanjay Prasad (57) ABSTRACT

A Web agent software interface between a relational database and Web-based application programs employs stored SQL procedures to store, update and retrieve multimedia objects. Web based applications manipulate the data in the relational database table by using URLs consisting of an alphanumeric designation of the host computer and port, the Web agent program associated with the database, the database agent configuration information associated with the database, specific stored SQL procedure for performing the desired data manipulation, and additional parameter data needed to specify and manipulate a particular multimedia object. A clipboard application program provides a graphical user interface which a user may employ to select and view selected multi-media objects stored in selected relational database tables, and to transfer the Web URLs designating those selected objects to other Web applications, such as HTML authoring tools, using convenient "drag-and-drop" and "cut, copy and paste" operations. The Web agent program retrieves data from the database which are designated by such URLs, and accepts POST requests from HTML forms which are activated by the user of a Web browser to load or update data in the relational database.

10 Claims, 4 Drawing Sheets

METHODS AND APPARATUS FOR USING MULTIMEDIA DATA STORED IN A RELATIONAL DATABASE IN WEB APPLICATIONS

FIELD OF THE INVENTION

This invention relates to methods and apparatus for storing, retrieving and manipulating multimedia data objects persistently stored in a relational database management system and, more particularly, although in its broader aspects not exclusively, to methods and apparatus which facilitate the use of such objects in Web applications.

BACKGROUND OF THE INVENTION

The Internet is changing the way data is managed. Even in the most traditional companies, systems that were once experiments in electronic commerce are becoming significant contributors to business success. The Web site has increasingly replaced traditional vehicles for disseminating policies, procedures, product information, and support for critical business processes. Almost without notice, home-grown Internet applications have become production systems essential to core functions of the enterprise. As a consequence, simple file-based systems, similar to ones that enterprises discarded 20 years ago in favor of more reliable relation data management systems, are now often central to essential Internet functions.

The Internet has also changed the nature of data itself. Internet applications increasingly contain multimedia content, such as images and audio and video clips. The image, audio, and video content used in Internet applications have become important company assets that are represented in formats like WAVE, AVI, QuickTime, RealAudio, RealVideo, TIFF, GIF, JPEG, etc. typically supported using file-based servers.

When only a small number of people need access to such information, the file-based Web server is a reasonable solution. The information or assets stored in these servers is important, but doesn't normally require constant availability and, in many cases, only affects a few people. But when, for example, photos are part of an electronic commerce system, thousands of customers and prospects may be affected. When those same images are used in an Extranet for supply chain applications, they must also be tied to price files, inventory systems, and distribution systems. The situation becomes even more complex when the information used in the applications includes many types of multimedia objects as is typical in Internet applications.

Storing multimedia data, including images and audio and video clips, in a relational database management system (RDBMS) offers significant advantages. Relational databases provide the ability to store, manage, manipulate and retrieve data organized in complex logical structures. See, for example, *The Handbook of Relational Database Design* by C. C. Fleming and B. Vonhalle; Addison-Wesley Pub Co; ISBN 0201114348 (August 1988). Modern relational databases are typically supported by robust procedural languages for manipulating the data as described, for example in *Oracle Pl/SQL Programming by Steven Feuerstein*, Bill Pribyl and Debby Russell, Editor; O'Reilly & Associates; ISBN 1565923359 (October 1997). For the same reasons that led to the wide adoption of RDBMS systems for traditional forms of business data, there is a need for methods and apparatus which simplify the task of extending the relational database's reliability, availability and data management capabilities to the multimedia content used in Internet, electronic commerce and media-rich applications.

SUMMARY OF THE INVENTION

In a principal aspect, the present invention takes the form of novel interface between Web based programs and a relational database. In accordance with the invention, multimedia objects stored in a relational database are identified by a Universal Resource Locator (URL) taking the form of a character string consisting of (a) an identification of the domain name and port of a host computer connected to the Internet, (b) the identification of a Web agent program which may be dynamically loaded or statically linked into the web server's or application server's environment and which operates as an interface to a relational database, (c) the specification of a specific SQL procedure for storing, retrieving or updating a particular data object, and (d) additional parameter information for specifying the row and column location of the object in a database table and any additional information needed by the SQL procedure for manipulating the object.

The principles of the invention are used to advantage in a clipboard application program which facilitates the use of multimedia objects in Web applications. The clipboard program provides a graphical user interface which may be used to easily identify and retrieve a multimedia object stored in the database and automatically place the URL which specifies that object in a Web page by using conventional "copy and paste" and "drag-and-drop" methods. The object's URL is transferred to another application, such as a Web page authoring tool for composing HTML pages. In addition, the clipboard may be used to capture a multimedia object from a device, such as a digital camera or scanner, or to fetch an object via the Internet, and to then store the new object in a selected row and column location in a selected database table.

The clipboard and Web agent's ability to generate and decode database URLs allows them to store, update and retrieve multimedia objects in the relational database and to serve as an interface between Internet Web and Java applications, such as Web browsers and Web page authoring tools. Multimedia objects stored in the database may be directly accessed via the Web agent using the URL. Web based HTML input forms may also be used to POST data directly into the relational database by using a URL to identify a previously stored SQL procedure and by passing other parameters as needed to the SQL procedure which performs an insert or update operation.

These and other objects, features and advantages of the present invention will become more apparent through a consideration of the following detailed description of a specific embodiment of the invention. In the course of this description, frequent reference will be made to the attached drawings.

DETAILED DESCRIPTION

The present invention simplifies the process of integrating multimedia data into Web and Java applications. Audio, video, and image data can be easily stored, retrieved, and managed in a relational database server by using two interacting components: a multimedia "clipboard" program and a "web agent" program which employ specially formed URLs to designate multimedia data objects stored in the relational database.

The clipboard helps the user to easily capture, store, and retrieve multimedia Web objects. Using its drag-and-drop features, multimedia objects can be retrieved from a database and displayed in a Web browser and other Web applications. When a visual representation of a multimedia object stored in a database is dragged and dropped into the screen area displayed by a Web authoring tools, the clipboard supplies the tool with the necessary URL for retrieving the stored object from the database. Using the clipboard, the user can also capture multimedia objects from executing applications, from connected devices, or from the Internet, and store these objects in the database.

The Web agent decodes URLs to retrieve multimedia object data for display in a Web browser or for other handling. In doing so, it returns the MIME type, content length, and content of the multimedia object. When the clipboard is used to retrieve, update or insert data, the Web agent executes SQL procedures or statements to retrieve, update or insert the multimedia data in the database.

Figure 1:
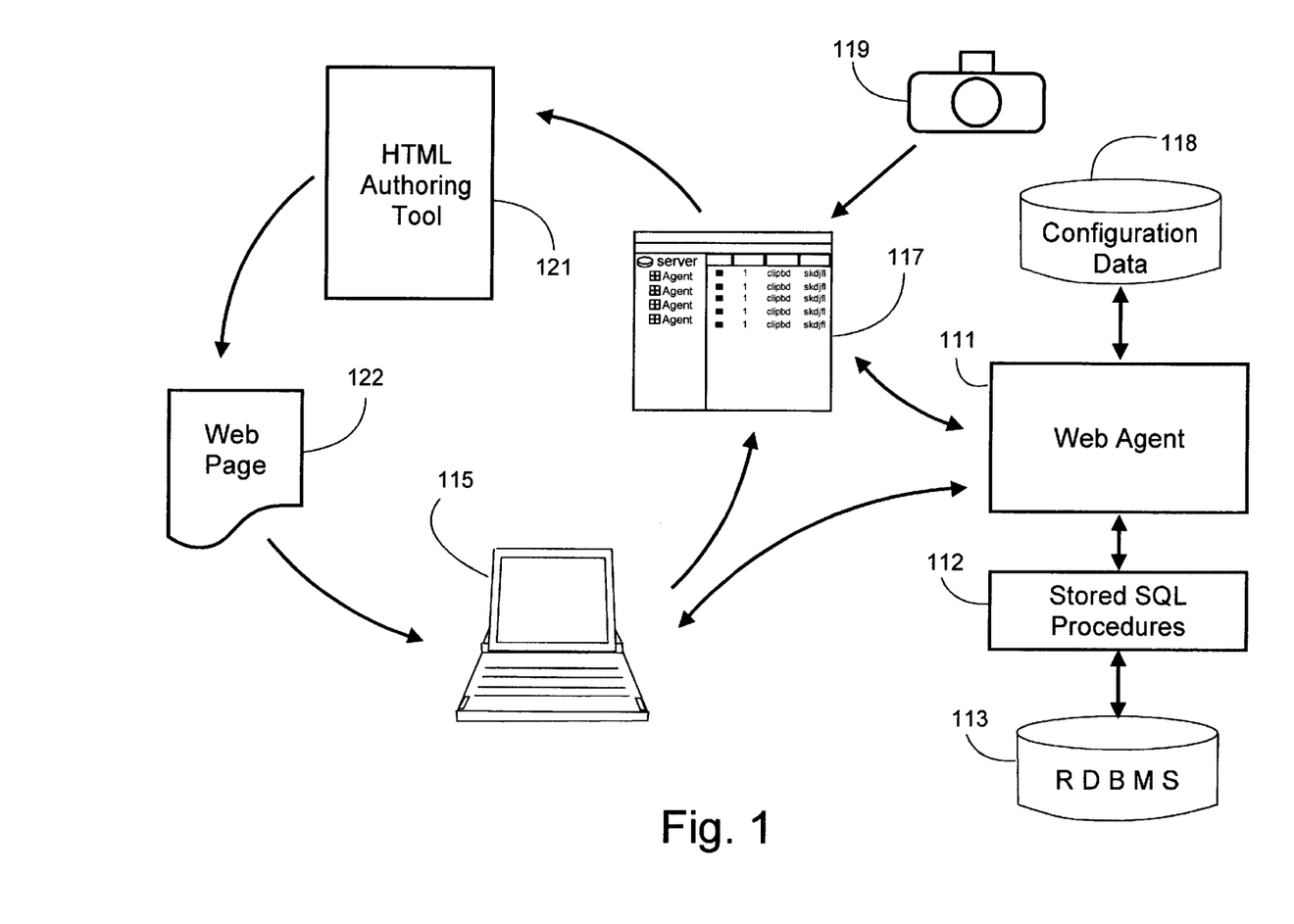
FIG. 1 is a block diagram illustrating the interactions that take place between the principle components employed by the invention.

FIG. 1 illustrates how the clipboard and Web agent work together to store, retrieve and manipulate multimedia data.

The Web agent, indicated at 111, decodes URLs supplied by a requesting application program to manipulate multimedia objects by executing SQL procedures which operate on designated data objects in a relational database 113. For example, multimedia objects may be specified by a URL for use in a Web application, for transfer to or from another executing application by the clipboard 117, or for other handling. The Web agent 111 responds to a request by returning the MIME type, content length, and content of the object to the requesting Web application. The Web agent invokes prewritten SQL procedures 112 stored in the database 113 (or executes an SQL statement supplied as part of the URL) and further employs a configuration file 118 to store data needed to establish connections with the database 113 and to authorize access to the database via these connections.

The clipboard 117 integrates multimedia data into Web and Java applications. Using the clipboard application, users can more easily store image, audio, and video data objects in a relational database server. URLs referencing such database-resident objects can be transferred between applications using the clipboard functions "copy" and "paste" as well as by "drag-and-drop" methods in the familiar way that file and memory based objects are manipulated by the standard clipboard features implemented by an operating system. For example, using the clipboard, the user can automatically transfer or manipulate the URLs needed to:

a. retrieve multimedia objects from the database;

b. drag references to multimedia objects stored in the database to a Web authoring tool;

c. capture multimedia objects from files or URLs and store them in the database;

d. capture image objects from external sources, such as cameras and scanners, and store them in the database; or e. edit multimedia objects with an editing application and reload the updated object into the database.

The clipboard indicated at 117 should be distinguished from the memory-based clipboard functions provided by the operating system, such as the Windows® clipboard. The operating system clipboard transfers data between applications by passing pointers to data between two applications which are programmed to exchange such data. In accordance with the present invention, the clipboard 117 and the Web agent 111 operate together as an interface to the database 113, providing Web and Java applications with URLs which uniquely designate persistently stored copies of the multimedia objects in the database. The conventional memory-based operating system clipboard can also be used to transfer the content of multimedia from one application to another when that content is memory resident.

The clipboard 117 includes means for capturing multimedia data from devices. For example, the data representing an image may be captured via a TWAIN interface from a camera (as illustrated at 119) or a scanner and stored at the relational database 113 by the Web agent 111. The clipboard 117 lists the image in a list of objects and displays the image in a display area. The user may then drag a reference to the image (its URL) from the clipboard 117 and drop it into an standard HTML editing tool at 121, such as Microsoft Frontpage®, which supports the passing of URLs in a compatible clipboard format. The resulting HTML Web page seen at 122 specifies the stored image by means of an HTML <img> tag holding the URL provided by the clipboard 117 which designates a persistently stored copy of the image in the database 113. The Web page 122 may be displayed in a Web browser 115 which uses the URL to fetch the image via the Web agent 111 which invokes an SQL procedure 112 specified in the URL.

URL Formats

When the clipboard 117 is used to retrieve Oracle8i interMedia objects from a database and drag a visual representation of selected objects into the screen area displayed by a Web authoring tool, the clipboard supplies a URL to the authoring tool. In the same way, when the clipboard 117 is used to store or update multimedia objects in a database, the clipboard constructs a URL. URLs which designate multimedia objects stored in a database have the following format:

http://domain:port/intermedia/agent_name/request_mode/proc_name/path_info

The same URL format is used by Web applications to retrieve, store, or update multimedia data in a database.

Figure 2:
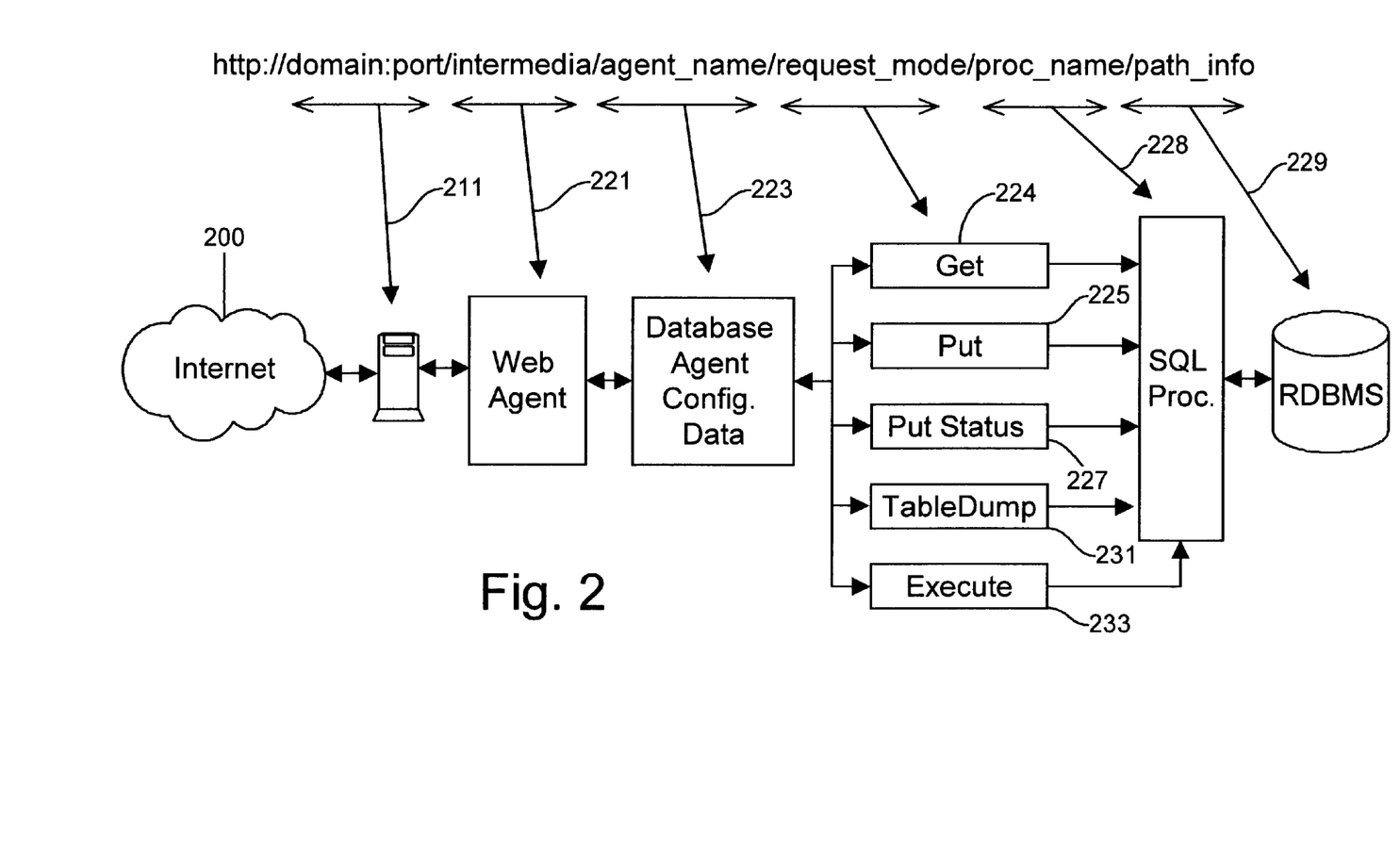
FIG. 2 is a diagram which illustrates the relationship between segments of an alphanumeric URL and the corresponding functional components of the multimedia access mechanism used the invention.

FIG. 2 illustrates the meaning of each portion of the URL constructed in accordance with this format as further described below:

| Item | Description |
| --- | --- |
| domain:port | The domain name and port number of the Web server, separated by a colon (:). As seen in FIG. 2, the domain:port portion of the URL designates the domain name, which is resolved into a 32 bit Internet address |

-continued

| Item | Description |
|---|---|
| | by the Internet Domain Name Service (DNS), of a particular server 211 connected to the Internet 200, and the port number which specifies a process running on the Web server 211 which handles incoming HTTP requests for access to a resource. |
| intermedia | The virtual path representing the Web agent seen at 221. |
| agent_name | The name of the "database agent" and its associated configuration data 223 which establishes the connection to the desired database. |
| request_mode | The name of the Web agent request mode: i.e., performing a GET operation (225), a PUT operation (226), obtaining status information in a fixed format (228) performing a TABLEDUMP operation (231) to retrieve a result set from the database, including obtaining metadata and application data, and executing an SQL statement to perform such operations as inserting or modifying the non-multimedia content of a row, deleting a row, and creating PL/SQL procedures generated by the code wizard. |
| proc_name | The name of a SQL procedure 228 used to retrieve or store the data. |
| path_info | Additional path information 229 containing one or more key values or other data used to perform the specified operation with respect to a particular multimedia object. |

Special purpose request modes in addition to those depicted in FIG. 2 may by employed to handle error reporting. For example, the clipboard 117 uses a special version of the GET request (CLIPBOARDGET) that returns error information with a reserved MIME type so that the clipboard can distinguish an error condition from the content of a multimedia object. When uploading content, the Clipboard uses a special form of the PUT request (CLIPBOARDPUT) where error conditions are returned as a text/plain response with a standard format, which is also how the TABLEDUMP and EXECUTE requests 231 and 233 work. In contrast, the GET and PUT requests 224 and 225 originating from Web pages or forms return HTTP status codes and/or optional HTML status pages indicating the success or failure of the request. If a GET request fails, the web agent tries to map the error to a suitable HTTP status such as 403 Not Authorized or 404 Not found. All errors that can't be mapped to a specific HTTP error are mapped to 500 Server Error. When a PUT request 225 succeeds, by default, the Web agent 111 builds an HTML page containing a success message. If a PUT request 225 fails, the web agents still builds an HTML page, but this time, the actual error message is included on the page. Note that an application (PL/SQL procedure or Java stored procedure) can modify the default behavior by explicitly directing the Web agent to redirect the client to a static error page or to a Web application that might dynamically build an error page. Finally, a debugging version of the GET request can be used to reports errors in the same way as the default PUT failure mode.

Note that, for compatibility, all portions of the URL should contain only those characters which are valid in an HTTP URL. Reserved characters such as spaces, ampersands, plus signs, question marks and percent signs should be escaped using %xx notation where xx is the hexadecimal value of the character (e.g., by convention, a space in the URL should be represented by "%20" and a space in a query string is represented by a "+").

The following example, which retrieves a photograph of an employee, shows a URL that uses the Web agent named "empdb_read", the request mode name "mediaget" specifies the GET mode), specifies using the SQL procedure "GET_EMP_PIC", and specifies a particular employee ID "20013":

http://www.orcl.com:8001/intermedia/empdb_read/mediaget/get_emp_pic/20013 http://www.orcl.com:8001/intermedia/empdb_read/mediaget?ord_sql=select+t.picture.GetContent()+as+ord_content_blob,+t.picture.GetMimeType()+as+ord_content_type,+t.picture.GetContentLength()+as+ord_content_length+from+employee_pic+t+where+t.emp_id%3d20013

The URL must be on one line but is shown above on multiple lines for readability. Note the clipboard generates additional information in the URL that specifies the properties of the data after it is stored in the database.

The Clipboard

The clipboard, seen at 117 in FIG. 1, like any other application program, may be launched by name or from an operating system menu. When first invoked, the clipboard displays a dialog box which prompts the user to select the domain name and port of the web server for which the Web agent has been configured, and to further provide the virtual path name (e.g. "intermedia") of the Web agent. The clipboard then prompts the user to enter a user name and password which provides secure access to a listing of database agent names authorized for clipboard access.

Figure 3:
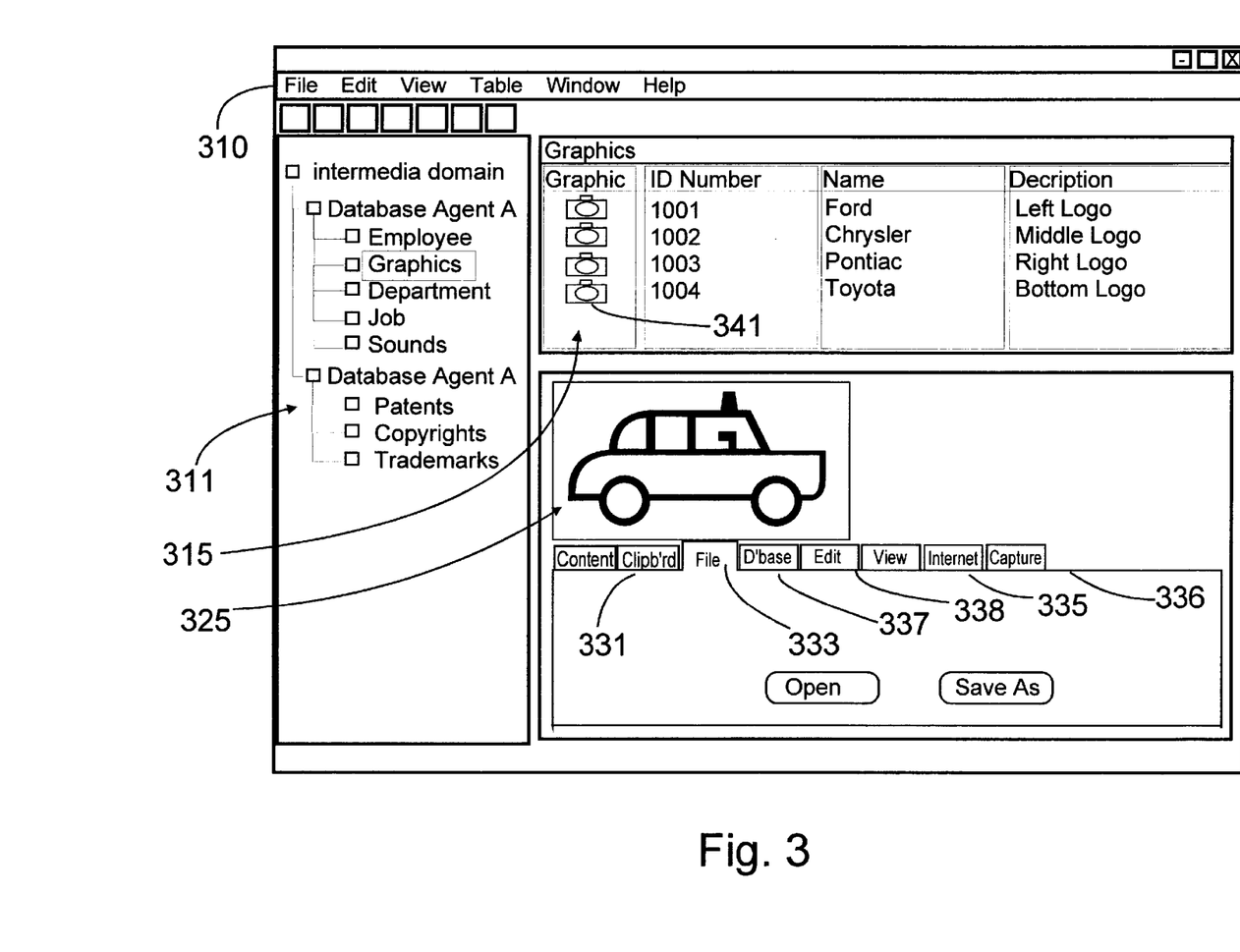
FIG. 3 illustrates the screen display produced by a clipboard application program which implements the invention.

FIG. 3 illustrates the layout of the screen display produced by the clipboard. In addition to a conventional menu bar at 310, the clipboard display includes a navigator tree seen at 311 which displays lists of Web servers, database agents, and database tables in a hierarchical, collapsible outline view. The display further includes a table view at 315 which displays the rows and columns in the database table highlighted in the navigator tree 311. At 325, the clipboard display provides an object view which displays the multimedia object and a tabbed property sheet for that object.

The following steps are performed to use the clipboard and Web Agent to insert or update multimedia objects in a database:

1. Create and store SQL procedures that can insert and update the multimedia data in the table as described below using the code wizard functions described below.
2. Load the new or updated multimedia object into the object view of the clipboard using one of the several methods to be described.
3. If necessary, edit the multimedia object using a suitable editing program for objects of that type.
4. Load the new or updated multimedia object into the database using the previously stored SQL procedures.

To use the clipboard and Web agent to retrieve multimedia objects from a database, the user performs the following general steps:

1. Create and store SQL procedures that can retrieve the multimedia data from a designated table containing the desired multimedia objects, as described later.
2. Construct URLs for multimedia objects stored in the database by dragging an object's icon from the table view, seen at 315 in FIG. 3, to a Web authoring tool as seen at 121 in FIG. 1. At this time, the clipboard builds the URL that points to the multimedia object in the database.

A Web browser often caches the multimedia content and issues HTTP GET requests with the "If Modified-Since" extension to validate the current contents of the cache. When the Web agent receives such a request, it checks the actual modification date of the object in the database and if more recent, returns the actual content to the browser. If not more recent, the Web agent returns a status indicating that the browser has the most recent content.

The clipboard 117 and Web agent 111 employ stored SQL procedures to retrieve, store and update multimedia objects stored in database tables. Relational databases, such as the RDBMS 113 in FIG. 1 include SQL statement interpreters (as well as Java language virtual machines for executing stored Java procedures which execute SQL statements) to perform desired database operations. The clipboard 117 and Web agent 111 facilitate the task of creating and storing SQL procedures needed to retrieve, update, or insert multimedia objects in a database table by using a "code wizard" which prompts for the information needed to form the SQL procedures which are then interpreted by the RDBMS 113 to perform the desired database function.

When the Code Wizard is first used to create the SQL procedures for a particular column in a table, the user is prompted for all the information required to create those procedures. However, if the code wizard is subsequently used again on the same table, the user is provided with default values entered by the user from the previous use. If the user chooses new selections, then the code wizard will replace any existing procedures of the same name.

Once procedures have been created to access a column in a table, the web agent executes those procedures, supplying information to the procedures as necessary to locate the required data in the database.

To call a PL/SQL procedure, the web agent has to dynamically construct an anonymous PL/SQL block that invokes the procedure. This it does once, having looked up the metadata for the procedure to obtain information such as the names and data types of all the arguments in the argument list. Once created, this anonymous SQL block is retained until the web server is stopped or the web agent is instructed to reload the configuration file, at which time it closes any open database connections, releasing information about previously accessed SQL procedures at the same time.

To initially create and store the SQL procedures, the clipboard user performs these steps:

1. In the navigator tree 311, expand the list of servers, then expand the name of the particular database agent. The navigation tree 311 the displays the tables to which the database agent has access.
2. Select the desired table from the list of tables in the navigator tree 311.
3. Invoke the code wizard from the clipboard's main menu bar (e.g. Table→Code Wizard).
4. Complete the form presented by the code wizard, selecting a key value of the selected table to be used to specify the desired object.
5. To create an Insert SQL Procedure, which allows the user to insert textual and numeric data into new rows in this table, select the Insert option and then enter a name for the new insert SQL procedure, such as "INSERT_ EMP_ROW".
6. The code wizard displays the columns of the table. Using the control key and the mouse, select the columns for which the user should enter data and which the clipboard stores when a new row is inserted. For example, to store a photograph of an employee in an employee table, it might be necessary to identify an employee by name or number in addition to supplying their home address.
7. To create an Update SQL Procedure, which allows the user to modify textual and numeric data in existing rows in this table, select the Update option and then enter a name for the new update SQL procedure, such as "UPDATE_EMP_ROW".
8. The code wizard displays the columns of the table. Using the Control key and the mouse, select the columns which the user may modify and which the clipboard updates when an existing row is updated. For example, an employee's address may need to be updated in addition to allowing their photograph to be updated.
9. From a displayed list box, select the object type (e.g. "PICTURE") to indicate that multimedia objects will be stored in the designated column. If multimedia objects are stored in more than one column in the table, additional columns may be specified.
10. To create a Get Object procedure to retrieve multimedia objects from the column, select that option and enter a name for the new Get Object procedure.
11. To create a Put Object procedure to use the clipboard to store multimedia objects in the column, select that option and enter the name of the new Put Object procedure.
12. When a multimedia object is stored in a table, certain attributes of the object may need to be set. Enter the name for the new Set Attribute procedure. If more than one column was specified in Step 9, the clipboard prompts the user for Get Object, Put Object, and Set Object procedures for those columns.

When the SQL procedures have been created using the code wizard, the clipboard may be used to easily insert multimedia objects into a database. First, the user uses the navigation tree seen at 311 in FIG. 3 to select a particular table which is then displayed in the table view at 315. To insert a new row of data into this table, the user selects Table and Insert Row from the clipboard menu bar at 310. The clipboard then prompts the user with a series of dialog boxes which accept the values to be entered for the designated columns in the row. The clipboard then displays the object view at 325 for the new row.

A multimedia object may be loaded using the object view using one of the following methods:

a. From the "Clipboard" tab at 331, click "Paste" to copy an object from the operating system clipboard and paste it into the object view;

b. From the "File" tab at 333, click Open to open a file containing a multimedia object and display it in the object view;

c. From the "Internet" tab at 335, specify the URL of an object and then click "Fetch" (not shown) to fetch the object data via the Internet and place it in the object view;

d. From the "Image Capture" tab at 336, identify and start a particular device, such as an available TWAIN driver for a camera or scanner to capture the object and place it in the object view.

With the object loaded into the object view, the user may then select the "Database" tab at 337. The MIME type of the object is displayed and this value is passed via a parameter in the SQL procedure. The object is loaded into the database for persistent storage when user clicks on "Update" in the Database tab.

An existing multimedia object may updated in much the same way. The particular table containing the object is selected using the navigation tree 311, and a row and column is selected in that table using the table view 315 so that the object to be updated is displayed in the object view. The table view may be used to display a subset of the records in any table sorted in a desired order using conventional database query and sort procedures selected via the menu at 310. Once a particular object has been identified in a particular row and column location in the table view, that object may then be copied and pasted into an editor, saved as a file and opened in an editor, or replaced by a newly captured image or by a different image fetched via the Internet as described above. A list of one or more editors which may be invoked is presented at the Edit tab 338. When the updated image is present in the object view, the Update button at the Database tab 337 is clicked to update the object.

To retrieve an object from the database and use that object in an application that supports "drag-and-drop" operations, the object is first displayed in the object view as described above. The user then specifies Table→Drag Mode→Embed from the menu at 310 to place a reference (URL) to the database object in the target application, such as an HTML editor for creating Web pages. The necessary <img src="url"> tag including the database URL is then automatically inserted into the Web page HTML, and the image is seen in the Web page editor. Alternatively, by selecting "Edit→Drag Mode→Link" a link of the form "<a href="url">anchor text</a>" containing the object's database URL is automatically placed in the Web page HTML. Having selected the drag mode, the icon which represents the object in the table view as seen at 341 may be dragged to and dropped into the target application, such as the Web page authoring tool which constructs the appropriate HTML tag.

Storing Data From Web Pages

The Web agent illustrated at 111 in FIG. 1 may also be used to store data supplied via a Post request method from an HTML form. When the HTML Web page containing the input form is written, the parameters needed are incorporated into the form markup as illustrated by the following example:

```
<form
action="http://nedc.us.ora.com:8007/intermedia/emp_write/mediaput/
PUT_EMP_PIC"
method="post" enctype="multipart/form-data">
<input type="hidden" name="ord_post_put_call" value=
"SET_EMP_PIC">
Employee ID: <input type="text" name="ord_procedure_path"
length=5>
Employee Picture File: <input type="file" name="ord_content">
<input type="Submit" value="Store Employee Picture Now">
</form>
```

Figure 4:
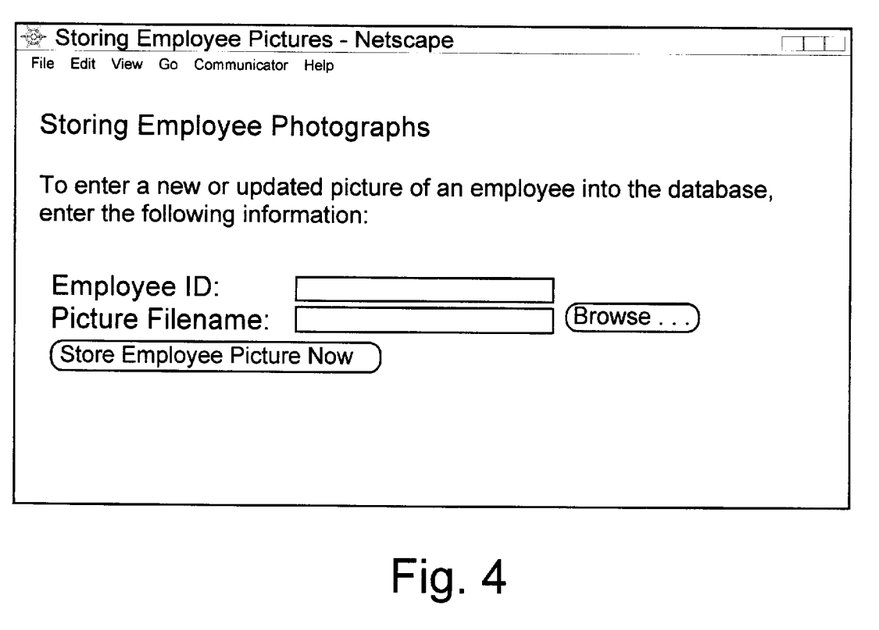
FIG. 4 illustrates an example screen display produced by a Web browser program when displaying an HTML data insertion form which can be used to load or update a multimedia object into a remote relational database via the Internet.

FIG. 4 of the drawings illustrates an HTML web page that contains the form specified by the markup above. Note in the HTML above that the "action" specifies the full URL pathname for the SQL procedure PUT_EMP_PIC which has been previously stored for use by the Web agent in storing multimedia objects in a particular database table. In the URL, "emp_write" is the database agent name. The encoding type is specified as "multipart/form-data" and the multimedia object is identified with the variable name "ord_content" which specifies the value entered by the browser user for the particular image file that contains the multimedia object to be loaded. The key value of the table row which is to receive the object is specified by the "ord_procedure_path" variable name, and the "ord_post_put call" variable name is used to set the properties of the data after it is stored in the database. The variable specifies the name ("SET_EMP_PIC") of the SQL procedure that performs post-processing.

Using the method illustrated above, multimedia objects may be inserted or updated into a Web server database from any Web browser. Similarly, as noted earlier, multimedia objects may be imbedded in, or linked from, a Web page display using conventional Web page authoring tools in combination with the automatic URL generation and transfer mechanism provided by the clipboard and Web agent.

Conclusion

It is to be understood that the methods and apparatus which have been described are merely illustrative applications of the principles of the invention. Numerous modifications may be made by those skilled in the art without departing from the true spirit and scope of the invention.

What is claimed is:

1. A method of storing and updating multimedia objects in a relational database and retrieving said objects via the Internet comprising, in combination, the steps of:

connecting a host computer to the Internet, programming said host computer to function as a relational database capable of storing, updating and retrieving data objects logically stored in one or more database tables, executing an application program which utilizes multimedia objects, executing a graphical user interface clipboard program for performing the steps of:

accepting from a user the designation of an agent program which provides access to said relational database, the designation of a particular table in said database, and the designation of a particular column in said particular table, accepting from said user and storing a SQL procedure at said host computer, said SQL procedure being expressed at least in part in a structured query language for manipulating a multimedia object in said particular column in said particular table, and transferring an alphanumeric Uniform Resource Locator which designates said SQL procedure from said clipboard program to said further application program, and executing said agent program for performing the steps of:

accepting a data manipulation request from said application program which includes said alphanumeric Internet Uniform Resource Locator, and invoking said SQL procedure designated by said alphanumeric Uniform Resource Locator to manipulate said multimedia object.

2. The method set forth in claim 1 further comprising the steps of:

placing a hypertext link in a Web page, said link including said Uniform Resource Locator, and processing said Web page in a browser application program to activate said hypertext link by transmitting said data manipulation request for processing by said agent program.

3. The method of claim 1 wherein said step of transferring is performed using an operating system interprocess data transfer procedure.

4. The method of claim 1 wherein said step of transferring is performed by executing a drag-and-drop procedure in which an iconic representation of said multimedia object is visually moved between a screen display area produced by said clipboard and a screen display area produced by said application program.

5. The method of claim 3 wherein transfer procedure is an operating system copy and paste procedure.

6. The method of claim 3 wherein said transfer procedure is an operating system cut and paste procedure.

7. Apparatus for storing, updating and retrieving data comprising, in combination,
- a host computer including a memory for storing programs and data,
- a relational database program stored in and executable by said host computer for storing, updating and retrieving data in one or more database tables, said relational database program including means for interpreting and executing stored data manipulation procedures expressed at least in part in a structured query language,
- means for storing at least one of said procedures for manipulating specific data stored in one or more of said database tables, said one of said procedures being designated by a procedure name and including means for processing externally supplied parameter information to locate said specific data in said database tables,
- a Web agent program stored in and executable by said host computer,
- a HTTP interface program for receiving data requests via the Internet from a remotely located computer directed to a resource specified by a multi-part alphanumeric Universal Resource Locator (URL) which consists of:
  - (a) an identification of the domain name and port of said host computer,
  - (b) the identification of said Web agent program which operates as an interface to a relational database,
  - (c) the specification of said one of said procedures, and
  - (d) said parameter information,
- said Web agent program including means for invoking the operation of said database program to perform said one of said procedures to perform a predetermined data manipulation operation with respect to said specific data, and
- a graphical interface application program stored in and executable by said host computer for transferring data from said relational database to a second application program executing on said host computer, said clipboard application program comprising:
  - means for displaying representations of the content of said database tables,
  - means for accepting from a user an identification of at least a selected one of said displayed representations to identify said specific data stored in one or more of said database tables, and
  - means for transferring to said second application program a Uniform Resource Locator which specifies one of said procedures and parameter information and may be transmitted to said interface program to invoke said Web agent program for retrieving said specific data from said database tables using said one of said procedures.

8. The apparatus of claim 7 wherein said means for transferring includes means for performing a drag-and-drop procedure in which an iconic representation of said specific data is visually moved between a screen display area produced by said clipboard application program and a screen display area produced by said second application program.

9. The apparatus of claim 8 wherein said means for transferring further includes means for performing a copy and paste procedure.

10. The apparatus of claim 9 wherein said means for transferring further includes means for performing a cut and paste procedure.

* * * * *